(12) United States Patent
Aanenson et al.

(10) Patent No.: US 8,533,990 B2
(45) Date of Patent: Sep. 17, 2013

(54) DEEP SEA FISHING LURE

(75) Inventors: Eric E. Aanenson, Maui, HI (US); Keith Ernzer, Maui, HI (US); Robert D. Hupfer, Maui, HI (US)

(73) Assignee: Eric E Aanenson, Kihei Maui, HI (US)

( * ) Notice: Subject to any disclaimer, the term of this patent is extended or adjusted under 35 U.S.C. 154(b) by 912 days.

(21) Appl. No.: 10/773,504

(22) Filed: Feb. 6, 2004

(65) Prior Publication Data

US 2004/0200122 A1 Oct. 14, 2004

Related U.S. Application Data

(60) Provisional application No. 60/446,766, filed on Feb. 11, 2003.

(51) Int. Cl.
*A01K 85/00* (2006.01)
*A01K 85/01* (2006.01)

(52) U.S. Cl.
USPC .......................... 43/17.6; 43/42.28; 43/42.33

(58) Field of Classification Search
USPC .............. 43/17.6, 42.24, 42.26, 42.28, 42.33, 43/42.34, 42.35, 42.39
See application file for complete search history.

(56) References Cited

U.S. PATENT DOCUMENTS

| | | | |
|---|---|---|---|
| 3,721,033 A * | 3/1973 | Haynes | 43/17.6 |
| 3,828,177 A * | 8/1974 | Day | 43/17.6 |
| 3,952,445 A * | 4/1976 | Liebert | 43/42.34 |
| 4,175,348 A * | 11/1979 | Ray | 43/17.6 |
| 4,227,331 A | 10/1980 | Ursrey et al. | |
| 4,250,650 A * | 2/1981 | Fima | 43/17.6 |
| 4,347,681 A | 9/1982 | Fima | |
| 4,516,350 A * | 5/1985 | Malphrus | 43/17.6 |
| 4,727,674 A * | 3/1988 | Garr | 43/17.6 |
| 4,741,120 A | 5/1988 | Cota et al. | |
| 4,757,632 A | 7/1988 | Grobl | |
| 4,799,327 A | 1/1989 | Treon | |
| 4,811,513 A | 3/1989 | Grobl | |
| 4,819,361 A | 4/1989 | Boharski | |
| 4,888,905 A | 12/1989 | Garr | |
| 4,959,919 A | 10/1990 | Rao et al. | |
| 5,063,700 A | 11/1991 | Kiefer et al. | |
| 5,175,951 A | 1/1993 | Fruchey | |
| 5,330,282 A | 7/1994 | Rodgers | |
| 5,392,555 A | 2/1995 | Tingey | |
| 5,697,182 A * | 12/1997 | Rodgers | 43/17.1 |
| 5,983,553 A | 11/1999 | Gordon | |
| D429,310 S | 8/2000 | DiLiberti | |
| 6,098,331 A | 8/2000 | Kim et al. | |
| 6,393,757 B2 * | 5/2002 | Bomann | 43/42.09 |

(Continued)

*Primary Examiner* — David Parsley
(74) *Attorney, Agent, or Firm* — Dicke, Billig & Czaja, PLLC

(57) ABSTRACT

A deep sea fishing lure has a generally cylindrical housing that is covered by a jacket that resembles a favored prey of sport fish such as a squid. The housing is light-transmissive and contains sets of flashing lights. One set of lights is linear and parallel to the direction of travel of the lure through the water. Another set is arranged is a circular array facing aft of the lure. A fiber optic bundle is installed in the housing. An interior end of the fiber optic bundle is next to the circular light set to accept light from the light set and transmit it to the outer end of the fiber optic bundle in order to attract a game fish. A flasher module operates to sequentially flash or blink the lights. A rechargeable power supply supplies power to the lights.

36 Claims, 6 Drawing Sheets

(56) References Cited

U.S. PATENT DOCUMENTS

| | | | |
|---|---|---|---|
| 6,581,319 B2 * | 6/2003 | West | 43/26.2 |
| 6,647,659 B1 * | 11/2003 | King et al. | 43/17.6 |
| 6,796,077 B1 * | 9/2004 | Dupree et al. | 43/17.6 |
| 2001/0013193 A1 | 8/2001 | Schultz et al. | |
| 2003/0182841 A1 * | 10/2003 | Calak et al. | 43/17.6 |

* cited by examiner

_DEEP SEA FISHING LURE_

CROSS REFERENCE TO RELATED APPLICATION

This application claims the benefit of U.S. Provisional Patent Application Ser. No. 60/446,766 filed Feb. 11, 2003.

BACKGROUND OF THE INVENTION

The invention pertains to a fishing lure for deep sea fishing. Deep sea fishing game fish are commonly found at depths beyond the reach of ambient sunlight encountered at the ocean surface. For example, large tuna can be found at depths of 250 feet. Artificial lures are commonly used in deep sea fishing. The artificial lure preferably appeals to one or more senses of the fish, including the sense of sight. Such lures are configured to resemble prey or food of the type favored by the game fish. Visual attraction to the fish is important. However, at depths where the large game fish are encountered, there is little ambient light. At best, an unlighted lure is illuminated on the top surface of the lure body by sunlight. At depth, the lure is hard to see by the game fish.

Prior art fishing lures are known to include a flashing, light emitting diode display. For example, such a lure is shown in U.S. Pat. No. 5,175,951 issued to Fruchey, Jan. 5, 1993.

SUMMARY OF THE INVENTION

The invention comprises a fishing lure particularly adapted for deep sea fishing. The fishing lure includes a lure body covered by a jacket. The jacket is configured to resemble an item of favored food prey for the game fish. In a preferred embodiment, the jacket is configured to resemble a squid. The jacket is formed of a light-transmissive material, such as a colored but clear soft rubber.

The lure body includes a generally cylindrical housing containing lure components potted in a clear epoxy resin. The cylindrical housing is formed of a light-transmissive material, either transparent or translucent, for example, a clear plastic such as Plexiglas.

Electronic components are installed inside the housing. These components include a first light array consisting of at least one and preferably two linear and parallel banks of light emitting diodes. A second light array includes a circular bank of light emitting diodes directed toward the rear or tail of the lure. One or two flasher modules are associated with the light arrays for sequentially flashing or blinking the lights.

Power is supplied by a battery pack. The battery pack is composed of a plurality of rechargeable batteries connected in series. The batteries can be 1.2 volt nickel hydride batteries producing approximately 5 volts. The battery pack is connected to a plug receptacle for connection to a battery charging unit. The plug receptacle is installed in the wall of the housing of the lure so as to be accessible from the exterior.

The first light array is carried on a first circuit board that is positioned so that parallel banks of light emitting diodes are substantially on opposite sides of the interior of the cylindrical housing. This provides substantially 360° visibility of the sequentially flashing lights.

A fiber optic bundle is installed in the rear of the cylindrical housing. The bundle includes a plurality of fiber optic strands that extend from the interior of the housing out the exterior thereof at the tail end. The interior ends of the fiber optic strands are closely located to the circular bank of light emitting diodes. The light emitting diodes of the circular bank illuminate the interior ends of the fiber optic strands. This illumination is carried to the outward ends of the fiber optic strands for visibility by game fish.

The light emitting diode circuit is connected to the battery pack by a magnetically actuated reed switch. A permanent magnet is held or swept in close proximity to the cylindrical housing to toggle the switch circuit between on and off positions to turn the light emitting diode display on and off.

DESCRIPTION OF A PREFERRED EMBODIMENT

Figure 1:
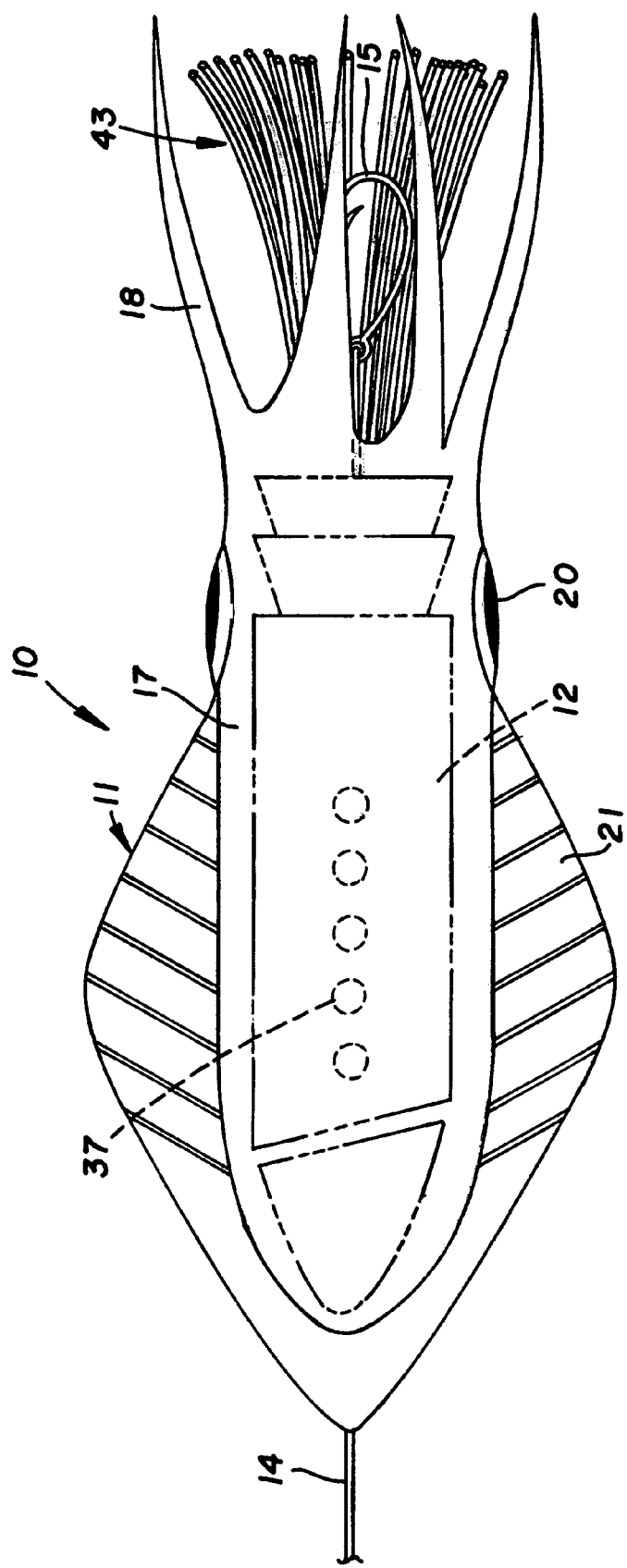
FIG. 1 is a side elevational view of the deep sea fishing lure according to one embodiment of the invention, this embodiment having an outer jacket configured to resemble a squid.

Referring now to the drawings, FIG. 1 shows a deep sea fishing lure according to one embodiment of the invention indicated generally at 10. The fishing lure 10 includes a jacket 11 and a lure body 12. Jacket 11 is formed of a light-transmissive material such as a clear soft rubber. Jacket 11 substantially covers the lure body 12. A leader wire 14 passes centrally through body 12 to a fish hook 15. In this particular embodiment the jacket is configured to resemble a squid, a favored form of prey for certain deep sea fish. To this end, the jacket 11 includes a squid torso 17 and tentacles 18 extending rearward from the torso 17. Reflective eyes 20 are located approximately at the juncture of the torso 17 and the tentacles 18. Fins 21 extend outward from the torso 17.

Figure 2:
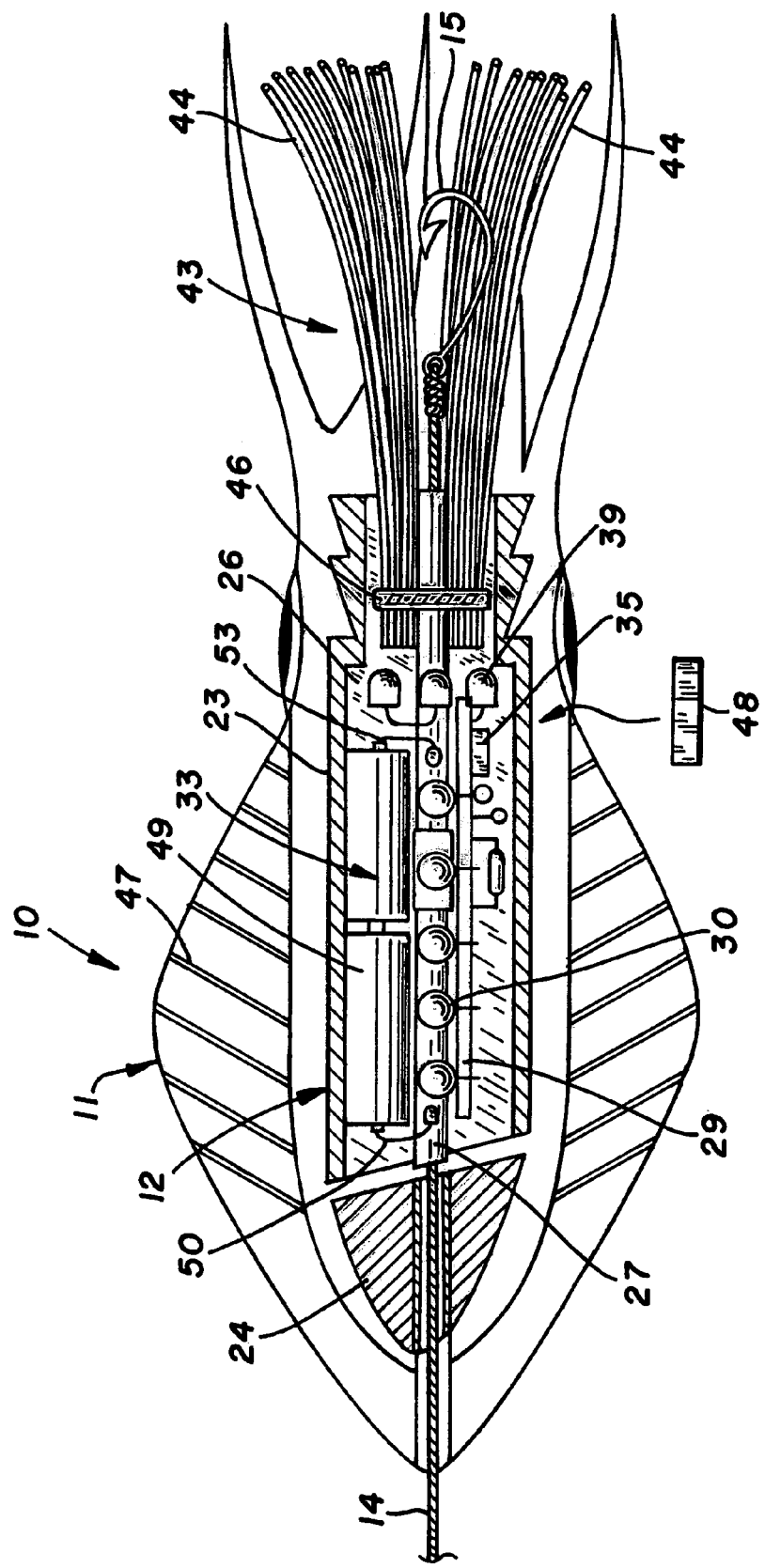
FIG. 2 is a view partially in section of the lure of FIG. 1 so as to enable illustration of the interior components thereof.

More particularly with reference to FIG. 2 the lure body 12 is shown in sectional view for purposes of illustration. The lure body 12 includes a light-transmissive cylindrical housing 23. A weight 24 can be positioned ahead of the body 12. Housing 23 has sidewalls that define an interior space for accommodation of the lure components. The interior of the housing 23 is filled or potted solid with a clear polyester resin 26 to hold the various components in place as well as to protect them from the effects of high pressure at sea depths and from the corrosive effects of salt water.

Figure 4:
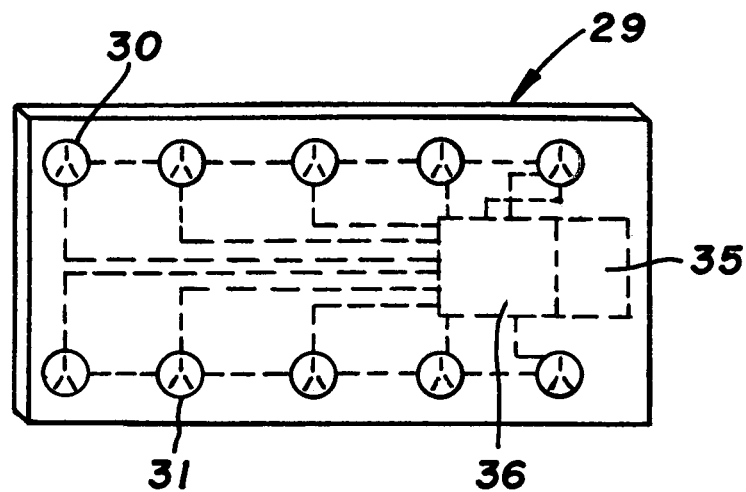
FIG. 4 is a schematic plan view of the first circuit board having first and second banks of light emitting diodes.

A metal leader tube 27 is positioned centrally in housing 23 and serves as an anti-chaffing conduit for the leader wire. Leader wire 14 passes through the leader tube 27 and corresponding openings in weight 24 and jacket 11. A first mounting board 29 is located inside the housing 23. As shown in FIG. 4, the first board 29 carries a first linear bank of lights 30 and a second parallel bank of lights 31. Each bank of lights includes five lights comprised as light emitting diodes. Board 29 is connected to a battery pack 33 through a switch 35. A sequencing flasher module 36 is connected to the board 29 and connected to the first and second light banks 30, 31.

Sequencing flasher module 36 controls sequential flashing or blinking of the lights of the light emitting diodes banks 30, 31. In a preferred embodiment, the light emitting diodes flash sequentially from the rear toward the front alternating from one bank to the other. The lights can be colored, respectively, in each bank, white, blue, green, orange and red. Alternatively all of the lights can be the same color such as green. The lure body 12 can have outwardly protruding bumps indicated in phantom at 37 in FIG. 1, in the vicinity of the lights of banks 30, 31 to magnify the lights.

As installed in the housing 23, board 29 is positioned so as to substantially span a width thereof with the banks of light emitting diodes parallel to the longitudinal axis of the cylinder. The light emitting diode banks 30, 31 are spaced apart sufficiently on the circuit board 29 such that they are visible through the wall of the housing 23 substantially 360 degrees around it.

Figure 5:
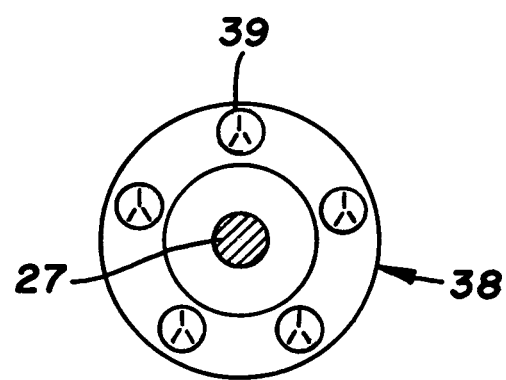
FIG. 5 is a schematic plan view of the second circuit board carrying a circular bank of light emitting diodes.

A second mounting structure or board 38 shown schematically in FIG. 5 is installed toward the rear of the housing 23. Second board 38 is carries a third bank of lights comprised as a circular array of five light emitting diodes 39. Lights 39 face aft. Second board 38 is also connected through the switch 35 to the battery pack 33 for power as well as to the flasher module 36 so that the lights flash in sequence. Lights 39 could alternatively be connected to a separate flasher module. Lights 39 can be colored like those of the first board 29.

A fiber optic bundle 43 is attached to the housing 23 and extends outward of it. As shown in FIG. 2, a fiber optic bundle 43 includes a plurality of individual fiber optic strands 44 bunched together and held by a band 46 surrounding the central shaft 27. The interior ends of the fiber optic strands are located in close proximity to the light emitting diodes 39 of the circular circuit board 38. The outer ends of the individual fiber optic strands 44 extend out through the aft end of the housing 23 and spread apart to form a three dimensional fan-type formation. Light from the light emitting diodes 39 is transmitted through the fiber optic stands to the outer ends presenting an illumination pattern attractive to the prospective game fish.

Additional fiber optic strands 47 can be embedded in fins 21 of the squid jacket to transmit light from housing 23 to the ends of the strands 47.

On and off operation of the lure light display is controlled at the switch 35. Switch 35 is a magnetically actuated reed switch as is known in the art. A permanent magnet 48 can be moved into close proximity to the switch 35 to toggle the switch circuit between "on" and "off" positions. The magnet 48 is positioned exteriorly to the housing 23 and is accordingly non-invasive.

Battery pack 33 includes four rechargeable nickel hydride batteries and a recharging circuit. Leader tube 27 is brass or another electrically conductive metal or other material. A first lead wire 50 is connected between one end of the leader tube 27 and one end of battery pack 33. A second lead wire 53 is connected between the other end of leader tube 27 and the battery pack 33. One lead wire is connected to the positive (+) end of the battery pack, and the other is connected to the negative (−) end of the battery pack.

Figure 3:
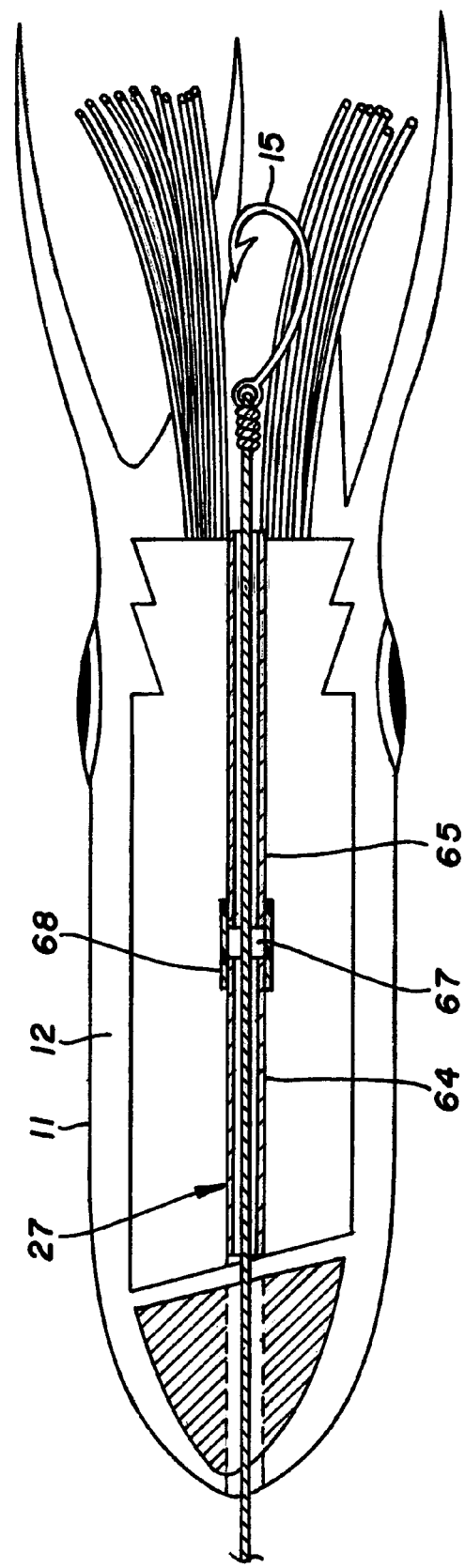
FIG. 3 is another view of the lure of FIG. 1 with components and parts removed for the purpose of clarification in order to show the central leader tube of the lure which forms a part of the recharging circuit for the battery pack.
Figure 8:
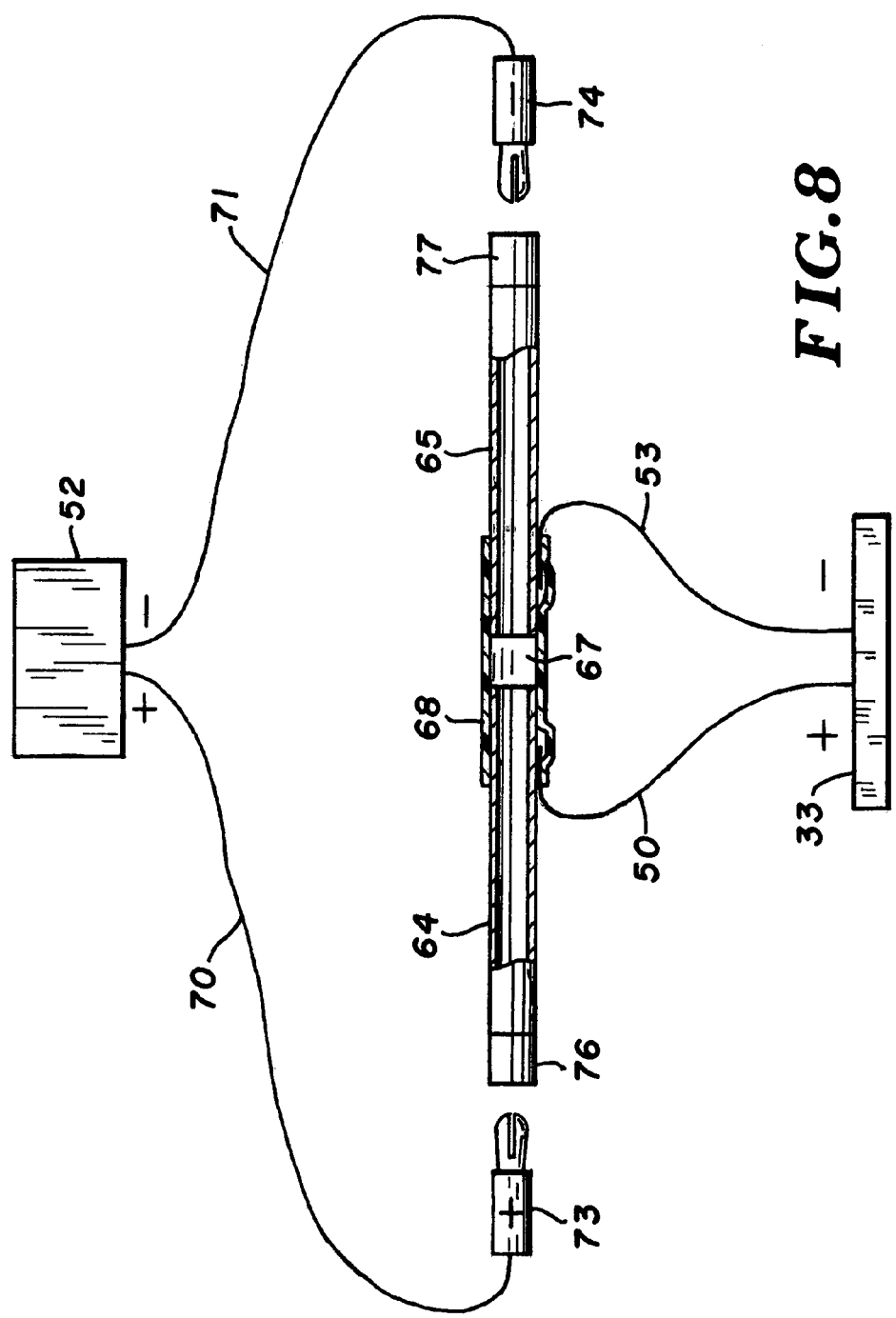
FIG. 8 illustrates the battery charger connection circuit of the fishing lure.

FIGS. 3 and 8 more particularly depict the connection between the battery pack 33 and a battery charger. The leader tube 27 is divided into a forward component 64 and an aft component 65. The forward and aft components are axially spaced apart by an air gap 67. A tubular insulator-spacer 68 connects adjacent ends of the forward and aft components and maintains them spaced apart so as to maintain gap 67.

As shown in FIG. 8, a battery charger 52 has first and second output leads 70, 71 which can be designated positive and negative as indicated. A first banana plug 73 is attached to the end of the first output lead 70. A second banana plug 71 is attached to the end of the second output lead 71. The banana plugs fit into and make electrical connection with the outer ends of the leader tube components 64, 65. The ends of the leader tube components can be color-coded to indicate proper connection with the battery charger output leads. The forward end of the forward leader tube component can have a red colored band 76 indicating a positive electrical connection with the banana plug 73 (which also can be correspondingly colored red) connected to the positive output terminal of the battery charger 52. The aft end of the aft leader tube component 65 can have a black colored band 77 indicating a proper connection to the banana plug 74 (which can also be colored black) connected to the negative terminal of the battery charger 52.

In use when it is time to recharge the batteries 49, the jacket 11 is removed from the lure body 12 and the leader 14 is removed as well. The battery charger leads 70, 71 are connected to the battery pack for recharging the batteries by connecting the banana plugs 73, 74 to the proper ends of the components 64, 65 of leader tube 27. This is done while carefully observing the proper electrical polarity which is facilitated by the color coding. The air gap spacing 67 and the alignment of the leader tube components are maintained by the spacer 68 which can be a semi-rigid jacket of polyolefin heat-shrink tubing. A rectifier diode can be provided in the internal charging circuit to prevent reverse current through the charging leads when the lure is in use and conductive leader wire or salt water short circuits the leader tube components, and also to prevent damage to the batteries if the leads of the external charger are accidentally connected in reverse.

Figure 6:
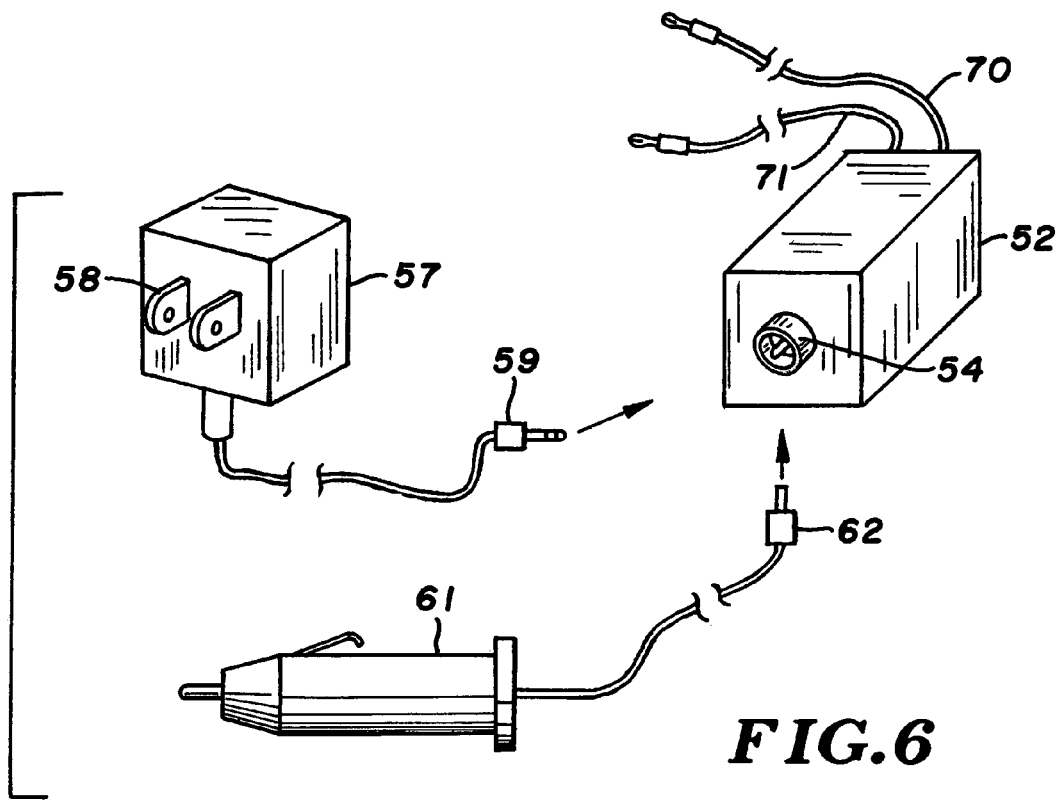
FIG. 6 shows the battery charging assembly for the battery pack of the fishing lure of the invention.

FIG. 6 shows a battery charging assembly for recharging the batteries 49 of the battery pack 33. The charger assembly includes a battery charger 52 having a 12-volt dc input receptacle socket 54 and a converter to 5-volt dc at output terminals 70, 71. The charger assembly also includes a 110-volt alternating current to 12-volt dc converter 57. Converter 57 has the usual prongs 58 to plug into a normal 110-volt wall socket. Converter 57 has a 12-volt output plug 59 compatible with the socket 54 on the input of the charger unit 52.

In addition, the battery charging assembly includes a 12-volt adapter for connection to a 12-volt battery circuit as is found aboard a sport fishing boat. A plug 61 fits into the usual 12-volt socket found in connection with a 12-volt system such as the cigarette lighter socket in a sport fishing boat or an automobile. The plug 61 is connected to a smaller plug 62 which will provide the 12-volt output. Plug 62 is compatible with receptacle socket 54 on the charger 52.

In use of the charger, the battery pack 33 can be recharged using a 12-volt supply from boat or automobile, or from a 110-volt common household or other building current.

In use of the fishing lure, the fully charged lure is prepared for fishing in the usual fashion. The lure jacket is installed over the lure body. The jacket is interchangeable with other jackets so that the lure can take on the appearance of various aquatic species for the purpose of baiting the targeted sport fish. The illumination of the lure is turned "on" by bringing a magnet 48 in close proximity to the switch 35. The lure is lowered into the water to a depth necessary to attract the game fish. The illumination provided by the light emitting diodes is visible 360° around the lure at any depth. Additional illumination is provided by the circular bank of light emitting diodes and the transmission of light through the fiber optic bundle 43 to the rear of the lure.

Figure 7:
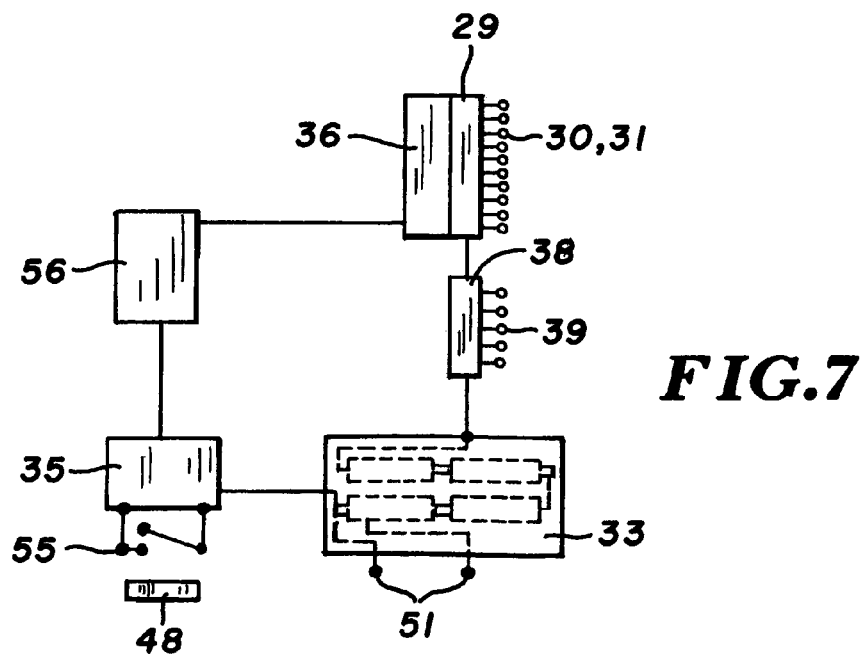
FIG. 7 illustrates an exemplary circuit for the light display of the fishing lure.

An example of a light display circuit is schematically depicted in FIG. 7. Reed switch assembly 35 includes a magnetically operated switch element 55 actuated by a permanent magnet 48. Switch assembly 35 is connected to power supply 33. First and second circuit boards 29, 38 are connected to flasher modules 36, 41 each comprised as an LM3914 display driver to sequentially blink the light emitting diodes of each of the circuit boards. A LMC timer IC 56 is connected between the switch 35 and the flasher modules 36, 41 to assure that both displays of light banks cycle with a repetition rate that is independent of battery voltage.

The embodiments of the invention in which an exclusive property or privilege is claimed are defined as follows:

1. A deep sea fishing lure comprising:
   a lure body;
   a removable, interchangeable jacket installed over and substantially covering the body and made of a light-transmissive material and configured to visually resemble a bait attractive to fish;
   said body including a housing with sidewalls made of a generally light-transmissive material and an interior space for accommodation of display lights;
   a first linear bank of display lights installed in the housing parallel to an intended direction of travel of the lure through a body of water and including a plurality of spaced apart individual electric light sources viewable through the light transmissive material sidewalls of the housing;
   a circular bank of display lights installed in the housing aft of the first linear bank of lights and including a plurality of spaced apart, aft facing individual electric light sources;
   a fiber optic bundle having a first end connected inside the housing next to the circular light bank so as to receive light from the circular light bank, and a second end extending aft out of the housing to transmit light from the circular light bank;
   a battery pack installed in the housing and connected to the light sources; and
   an on/off switch connected between the display light sources and the battery pack to turn the display lights on and off.

2. The fishing lure of claim 1 including:
   a second linear bank of display lights parallel to the first bank including a plurality of spaced apart individual electric light sources viewable through the light transmissive material sidewalls of the housing.

3. The fishing lure of claim 2 including:
   at least one flasher module connected to said light banks operative to flash lights of the light banks on and off for the purpose of attracting fish.

4. The fishing lure of claim 3 wherein:
   said flasher module is operative to sequentially flash lights of the light banks.

5. The fishing lure of claim 4 wherein:
   the light sources of said light banks are light emitting diodes.

6. The fishing lure of claim 4 including:
   a clear epoxy resin filling the interior space of the housing and encapsulating the items therein.

7. The fishing lure of claim 4 wherein:
   said on/off switch is a magnetically actuated reed switch operable through the use of a magnet held exteriorly to the housing.

8. The fishing lure of claim 4 wherein:
   said jacket is configured in the likeness of a squid.

9. The fishing lure of claim 4 wherein:
   said battery pack includes a plurality of rechargeable batteries, and a recharging circuit connected to the batteries and a recharging receptacle installed in the housing sidewalls.

10. The fishing lure of claim 1 including:
    at least one flasher module connected to said light banks operative to flash light sources of the light banks on and off for the purpose of attracting fish.

11. The fishing lure of claim 10 wherein:
    said flasher module is operative to sequentially flash light sources of the light banks.

12. The fishing lure of claim 11 wherein:
    said flasher module is a connected to the first linear light bank operative to sequentially flash the light sources, and including a second flasher module connected to the circular light bank operative to sequentially flash the light sources of the circular light bank.

13. A deep sea fishing lure comprising:
    a lure body;
    a removable, interchangeable jacket installed over and substantially covering the body and made of a light-transmissive material and configured to visually resemble a bait attractive to fish;
    said body including a housing with sidewalls made of a generally light-transmissive material and an interior space for accommodation of display lights;
    a first linear bank of display lights installed in the housing parallel to an intended direction of travel of the lure through a body of water and including a plurality of spaced apart individual electric light sources viewable through the light transmissive material sidewalk of the housing;
    a circular bank of display lights installed in the housing aft of the first linear bank of lights and including a plurality of spaced apart, aft facing individual electric light sources;
    a fiber optic bundle having a first end connected inside the housing next to the circular light bank so as to receive light from the circular light bank and a second end extending aft out of the housing to transmit light from the circular light bank;
    a battery pack installed in the housing and connected to the light sources;
    an on/off switch connected between the display light sources and the battery ac to turn the display lights on and off;
    a second linear bank of display lights parallel to the first bank including a plurality of spaced apart individual electric light sources viewable through the light transmissive material sidewalls of the housing;
    at least one flasher module connected to said light banks operative to flash lights of the light banks on and off for the purpose of attracting fish wherein said flasher module is operative to sequentially flash lights of the light banks; and
    said battery pack is rechargeable and including a metal leader tube passing centrally through the lure body and the jacket for use as part of a circuit in recharging.

14. A deep sea fishing lure comprising:
    a lure body;
    a removable, interchangeable jacket installed over and substantially covering the body and made of a light-transmissive material and configured to visually resemble a bait attractive to fish;

said body including a housing with sidewalls made of a generally light-transmissive material and anterior space for accommodation of display lights;
a first linear bank of display lights installed in the housing parallel to an intended direction of travel of the lure through a body of water and including a plurality of spaced apart individual electric light sources viewable through the light transmissive material sidewalls of the housing;
a circular bank of display lights installed in the housing aft of the first linear bank of lights and including a plurality of spaced apart, aft facing individual electric light sources;
a fiber optic bundle having a first end connected inside the housing next to the circular light bank so as to receive light from the circular light bank, and a second end extending aft out of the housing to transmit light from the circular light bank;
a battery pack installed in the housing and connected to the light sources;
an on/off switch connected between the display light sources and the battery pack to turn the display lights on and off;
a second linear bank of display lights parallel to the first bank including a plurality of spaced apart individual electric light sources viewable through the light transmissive material sidewalk of the housing;
at least one flasher module connected to said light banks operative to flash lights of the light banks on and off for the purpose of attracting fish wherein said flasher module is operative to sequentially flash lights of the light banks; and
said battery pack is rechargeable and including a metal leader tube passing centrally through the lure body and the jacket for use as part of a circuit in recharging; and
the lights are green.

15. A deep sea fishing lure comprising:
a lure body;
a removable, interchangeable jacket installed over and substantially covering the body and made of a light-transmissive material and configured to visually resemble a bait attractive to fish;
said body including a housing with sidewalls that are made of a generally light-transmissive material and an interior space;
a circular bank of display lights installed in the housing circularly disposed about an axis parallel to an intended direction of travel of the lure through a body of water and including a plurality of spaced apart, aft facing individual electric light sources;
a fiber optic bundle having a first end connected inside the housing next to the circular light bank so as to receive light from the circular light bank, and a second end extending aft out of the housing to transmit light from the circular light bank;
a battery pack installed in the housing and connected to the lights;
an on/off switch connected between the display lights and the battery pack to turn the display lights on and off;
an electronic flasher module connected to said light bank operative to sequentially flash the light sources of the light bank on and off for the purpose of attracting fish.

16. The fishing lure of claim 15 wherein:
the light sources of said light bank are light emitting diodes.

17. The fishing lure of claim 16 wherein:
the lights are green.

18. The fishing lure of claim 15 including:
a clear epoxy resin filling the interior space of the housing and encapsulating the items therein.

19. The fishing lure of claim 18 wherein:
said on/off switch is a magnetically actuated reed switch operable through the use of a magnet held exteriorly to the housing.

20. The fishing lure of claim 18 wherein:
said jacket is configured in the likeness of a squid.

21. A deep sea fishing lure comprising:
a lure body;
a removable, interchangeable jacket installed over and substantially covering the body and made of a translucent material and configured to visually resemble a bait attractive to fish;
said body including a housing with sidewalls made of a generally light-transmissive material and an interior space for accommodation of display lights;
first and second parallel linear banks of display lights installed in the housing parallel to an intended direction of travel of the lure through a body of water and each including a plurality of spaced apart individual electric light sources viewable through the light transmissive material sidewalls of the housing;
a circular bank of display lights installed in the housing aft of the first and second linear banks of lights and including a plurality of spaced apart, aft facing individual electric light sources;
at least one flasher module connected to said light banks operative to flash of the light banks sequentially on and off for the purpose of attracting fish;
a battery pack installed in the housing and connected to the lights; and
an on/off switch connected between the display lights and the battery pack to turn the display lights on and off.

22. A deep sea fishing lure comprising:
a lure body having a forward end and an aft end that trails the forward end when the body is moved in an intended direction through a body of water to catch fish;
said body including a housing comprised of light-transmissive sidewalls and an interior space for accommodation of display lights;
a first linear bank of display lights installed in the housing parallel to an intended direction of travel of the lure through and including a plurality of spaced apart individual electric light sources viewable through the light transmissive material sidewalls of the housing;
a circular bank of display lights installed in the housing aft of the first linear bank of lights and including a plurality of spaced apart, aft facing individual electric light sources;
at least one electronic flasher module connected to said light banks operative to flash lights of the light banks on and off for the purpose of attracting fish;
a fiber optic bundle having a first end connected inside the housing next to the circular light bank so as to receive light from the circular light bank, and a second end extending aft out of the housing to transmit light from the circular light bank;
a rechargeable battery pack installed in the housing and connected to the lights;
an on/off switch connected between the display lights and the battery pack to turn the display lights on and off; and
a metal leader tube passing centrally through the body and connected to the battery pack for use as part of a circuit in recharging.

23. The fishing lure of claim 22 including:
a second linear bank of display lights parallel to the first bank.

24. The fishing lure of claim 23 wherein:
the light sources of said light banks are light emitting diodes.

25. The fishing lure of claim 24 wherein:
said on/off switch is a magnetically actuated reed switch operable through the use of a magnet held exteriorly to the housing.

26. A deep sea fishing lure comprising:
a lure body;
a jacket installed over and substantially covering the body and made of a light-transmissive material and configured to visually resemble a bait attractive to fish;
said body including a housing with sidewalls that are made of a generally light-transmissive material and an interior space for accommodation of display lights;
a circular bank of display lights installed in the housing circularly disposed about an axis parallel to an intended direction of travel of the lure through a body of water and including a plurality of spaced apart, aft facing individual electric light sources;
a fiber optic bundle having a first end connected inside the housing next to the circular light bank so as to receive light from the circular light bank, and a second end extending aft out of the housing to transmit light from the circular light bank;
a battery pack installed in the housing and connected to the lights;
an on/off switch connected between the display lights and the battery pack to turn the display lights on and off;
an electronic flasher module connected to said light bank operative to sequentially flash the light sources of the light bank on and off for the purpose of attracting fish;
said battery pack including a plurality of rechargeable batteries, and a recharging circuit connected to the batteries and a recharging receptacle installed in the housing sidewalls;
and including a metal leader tube passing centrally through the body and jacket and connected to the battery pack for use as part of a circuit in recharging.

27. The fishing lure of claim 26, in which the light sources of said light bank are light emitting diodes.

28. The fishing lure of claim 27, in which the lights are green.

29. The fishing lure of claim 26, including a clear epoxy resin filling the interior space of the housing and encapsulating the items therein.

30. The fishing lure of claim 26, in which the on/off switch is a magnetically actuated reed switch operable through the use of a magnet held exteriorly to the housing.

31. The fishing lure of claim 26, in which the jacket is configured in the likeness of a squid.

32. The fishing lure of claim 26, in which the jacket is removable and interchangeable.

33. A deep sea fishing lure comprising:
a lure body surrounding a housing comprised of light-transmissive sidewalls and an interior space;
at least one bank of multiple, spaced apart, individual electric display lights in the interior space, viewable through the light transmissive sidewalls of the housing;
a fiber optic bundle to transmit light aft from the display lights to outside the lure;
a rechargeable battery pack for the display lights installed in the housing; and
a leader tube, passing centrally through the body to the battery pack, that forms part of a recharging circuit, wherein a leader wire is extendable through the leader tube.

34. The fishing lure of claim 33, further comprising an on/off switch connected between the display lights and the battery pack.

35. The fishing lure of claim 34, in which the on/off switch is a magnetically actuated reed switch operable through the use of a magnet held outside the housing.

36. The fishing lure of claim 33, in which the display lights are light emitting diodes.

\* \* \* \* \*